United States Patent [19]

Hope et al.

[11] Patent Number: 4,842,005
[45] Date of Patent: Jun. 27, 1989

[54] MIXING APPARATUS AND SYSTEM

[75] Inventors: James E. Hope, Batavia; John C. Leyerle, Deerfield; Richard Birzer, Schaumburg; Jeffrey L. Hohman, Lincolnshire, all of Ill.

[73] Assignee: ITT Corporation, New York, N.Y.

[21] Appl. No.: 148,722

[22] Filed: Jan. 26, 1988

[51] Int. Cl.$^4$ ............................................. B64D 15/06
[52] U.S. Cl. ............................ 137/101.19; 244/134 C
[58] Field of Search ............... 244/134 C; 137/101.19, 137/101.21, 114

[56] References Cited

U.S. PATENT DOCUMENTS

| 3,243,123 | 5/1966 | Ingrhram et al. |
|---|---|---|
| 3,533,395 | 10/1970 | Yeste. |
| 3,612,075 | 10/1971 | Cook. |
| 3,794,301 | 2/1974 | Simmonds. |
| 3,843,099 | 10/1974 | Duncan. |
| 4,032,090 | 6/1977 | Thornton-Trump. |
| 4,073,437 | 2/1978 | Thornton-Trump. |
| 4,191,348 | 3/1980 | Holwerda. |
| 4,277,254 | 7/1981 | Hanson ...................... 137/101.19 X |
| 4,353,482 | 10/1982 | Tomlison et al. |
| 4,378,755 | 4/1983 | Magnusson et al. |
| 4,573,802 | 3/1986 | Kerrigan et al. |

FOREIGN PATENT DOCUMENTS

86/00592  1/1986  World Int. Prop. O. ...... 244/134 C

Primary Examiner—Robert G. Nilson
Attorney, Agent, or Firm—Menotti J. Lombardi

[57] ABSTRACT

A mixing apparatus and system is described for controlling the mixture of a de-icing fluid and water. Water, supplied by a centrifugal pump, is monitored by a flow meter which sends a flow rate signal to a controller. Glycol is supplied by another centrifugal pump to a calibrated multi-port digitally controlled flow valve. The temperature of the glycol and the pressure differential across the flow control valve are monitored by sensors, and the controller controls the flow of glycol from the flow control valve to maintain the preset glycol concentration.

20 Claims, 6 Drawing Sheets

MIXING APPARATUS AND SYSTEM

BACKGROUND OF THE INVENTION

In general, this invention relates to mixing apparatus and system for controlling the mixture of a de-icing fluid and water, and more particularly to an improved mixing apparatus and system for controlling the mixture of glycol and water for airplane de-icing.

It is generally understood that any airport facility that encounters freeze conditions must have some form of airplane de-icing capability. De-icing is accomplished by mixing glycol (ethylene glycol or propylene glycol) as the de-icing fluid and water in various combinations and temperatures. The resulting mixture is then sprayed on the airplane. The mixing is presently done, for example, by bulk-mixing at the spray truck, or by some form of pump package set pre-mix.

With the recent concern over airplane accidents involving icing, a great deal of emphasis has been placed on more reliable and highly accurate glycol and water mixing systems. Since glycol physical properties change drastically with temperature, constant adjustment is required to compensate for the changing airport conditions.

In order to overcome the foregoing problems and the limitations of the prior systems and equipment, an improved system and apparatus for mixing glycol and water is hereinafter described.

SUMMARY OF THE INVENTION

An object of the invention is to provide an improved system and apparatus for mixing a de-icing fluid and water.

Another object of the invention is to provide improved system and apparatus for mixing glycol and water.

A further object of the invention is to provide a computer controlled mixture system and apparatus for mixing glycol and water.

According to the broader aspects of the invention, water is supplied by a centrifugal pump from a water supply. Flow of the water is monitored by a flow meter which sends an analog signal to a controller. Glycol is supplied by a centrifugal pump to a calibrated multi-port digitally controlled flow valve. The temperature and pressure differential across the flow control valve are continually monitored by sensors which also send analog signals to the controller. The controller determines the flow of glycol required from the flow control valve to maintain a preset desired glycol concentration (0,30,50 or 100%). The controller sends a digital signal to a flow control valve which adjusts internal nozzles to achieve the desired glycol output. The mixture concentration is thereby compensated for temperature and density of the glycol. The adjusted gylcol and water supplied are mixed and sent through piping to be de-icing location.

According to a feature of the invention, the de-icing location includes a solenoid valve which is opened when a deadman switch associated with the nozzle of a hose is activated by the operator.

Another feature of the invention is that a local indicating panel at the de-icing location indicates to the operator the glycol concentration, the operative condition of the system, and includes an emergency stop switch.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
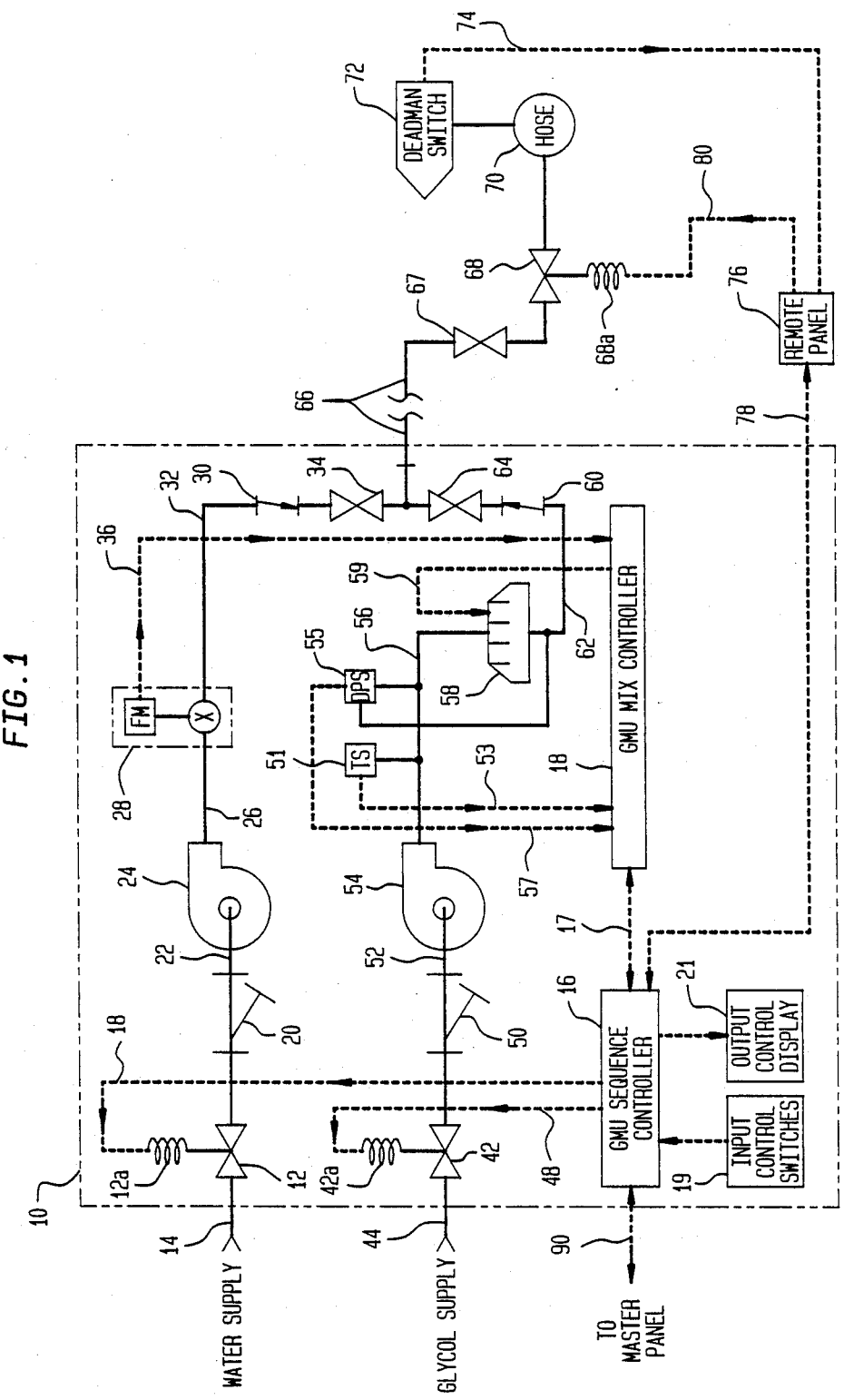
FIG. 1 is a schematic and functional block diagram of a preferred embodiment showing the improved system and apparatus of the invention.

Referring now to FIG. 1, the apparatus for mixing, a de-icing fluid and water is mounted on a skid 10. An electrically operated pneumatic isolating valve 12 having a coil 12a is coupled to a water supply by conduit 14. An electrical signal from the Glycol Mixing Unit (GMU) sequence controller 16 via line 18 opens and closes valve 12. A strainer or filter 20 is located in conduit 22 which is coupled to a centrifugal pump 24. Preferably, the pump is a Bell and Gossett (Morton Grove, Ill.) 1¼ BC Series 1531 pump with 15 HP motor and starter. The pump output is coupled by conduit 26 to flow sensor transmitter 28. The flow sensor transmitter may be a 1½ inch vortex shedding flow meter, such as Emco Model AT Series 90 (Enco Engineering Measurements Co., Longmont, Colo.).

A one-way check valve 30 is located in conduit 32 coupled between transmitter 28 and a manual balancing and shut off valve 34. An electrical signal (4–20ma D.C.) which is linearly proportional to the flow rate is coupled from transmitter 28 via line 36 as an input to GMU mix controller 18. Controller 18 is also electrically coupled via lines 17 to controller 16.

Another electrically operated pneumatic isolating valve 42 having a coil 42a is coupled to a de-icing fluid supply by conduit 44. The de-icing fluid may be a glycol, such as ethylene glycol or propylene glycol. An electrical signal from the controller 16 via line 48 opens and closes valve 42. A strainer or filter 50 is located in conduit 52 which is coupled to another centrifugal pump 54. Preferably, pump 54 is the same type and model as pump 24.

The pump 54 output is coupled by conduit 56 to an electrically controlled pneumatic actuated multi-port control valve 58. Valve 58 is electrically controlled by controller 18 via lines 59. The GMU mix controller is preferably a programmable processor FP-100 (Digital Valve Company, Longmont, Colo.) pre-programmed to control in response to the sensor inputs, valve 58 which may be a 2 inch Digicon-RC Valve (Digital Valve Company, Longmont, Colo.). A one-way check valve 60 is located in conduit 62 coupled between control valve 58 and another manual balancing and shut-off valve 64.

A temperature sensor transmitter 51 is connected in conduit 56 and produces an electrical signal (b 4–20ma D.C.) which is coupled via line 53 as an input to controller 18. Temperature sensor transmitter 51 may be an Emco Model RTD TEMP PROB (Emco Engineering Measurements Co., Longmont, Colo.). The signal produced by transmitter 51 is proportional to temperature, it being understood that glycol viscosity and specific gravity changes with temperature. A differential pressure transmitter 55 is also connected between conduits 56 and 62, to produce an electrical signal (4–20 ma D.C.) which is coupled via line 57 as an input to controller 16. The differential pressure transmitter signal is linearly proportional to the differential pressure across control valve 58, i.e. at the input conduit 56 and the output conduit 62. The differential pressure transmitter may be a Model 1151 DP Alphaline (Rosemont Co., Eden Prairie, Minn.).

In response to the temperature sensor signal, the differential pressure signal, and the flow sensor signal inputs, controller 18 produces pre-programmed signals which are coupled via lines 59 to the multi-port control valve 58. Valve 58 has multiple ports of various sizes which are pneumatically actuated, i.e. opened or closed, in response to the controller signals to accurately control the glycol output flow in conduit 62 in gallons per minute to match the water flow rate at the desired mix ratio. According to the preferred embodiment of the invention, the mix ratios have glycol concentrations of 0,30,50 and 100%, but it being understood that other mix ratios may be established according to predetermined requirements.

Mixed output conduit 66 contains the controlled glycol concentration which is coupled through a shut-off valve 67 and an electrical solenoid valve 68 to hose 70. The output nozzle of hose 70 contains a deadman switch 72 which, when squeezed, activates the switch to close a circuit in controller 16 which accomplished via line 74 thru a remote panel 76, and lines 78. Sequence controller 16 then transmits a signal coupled thru line 78, panel 76, and line 80 to open valve 68 and permit the controlled glycol-water mix to flow from the hose. Remote panel 76, since located adjacent the hose, would also include an emergency stop button.

It should be obvious to those skilled in the art that another solenoid valve and hose with deadman switch could be connected in parallel and coupled to conduit 66 so that two or more hoses could be operated from the same controlled output mixture.

GMU sequence controller 16 has inputs from input control switches 19 and outputs to an output control display 21. Controller 16 may also be coupled via lines 90 to a master panel which may monitor the operation of the unit on skid 10 or override controller 16. Thus many duplicate systems as shown in FIG. 1 may be monitored or controlled from a master panel if desired.

Figure 2:
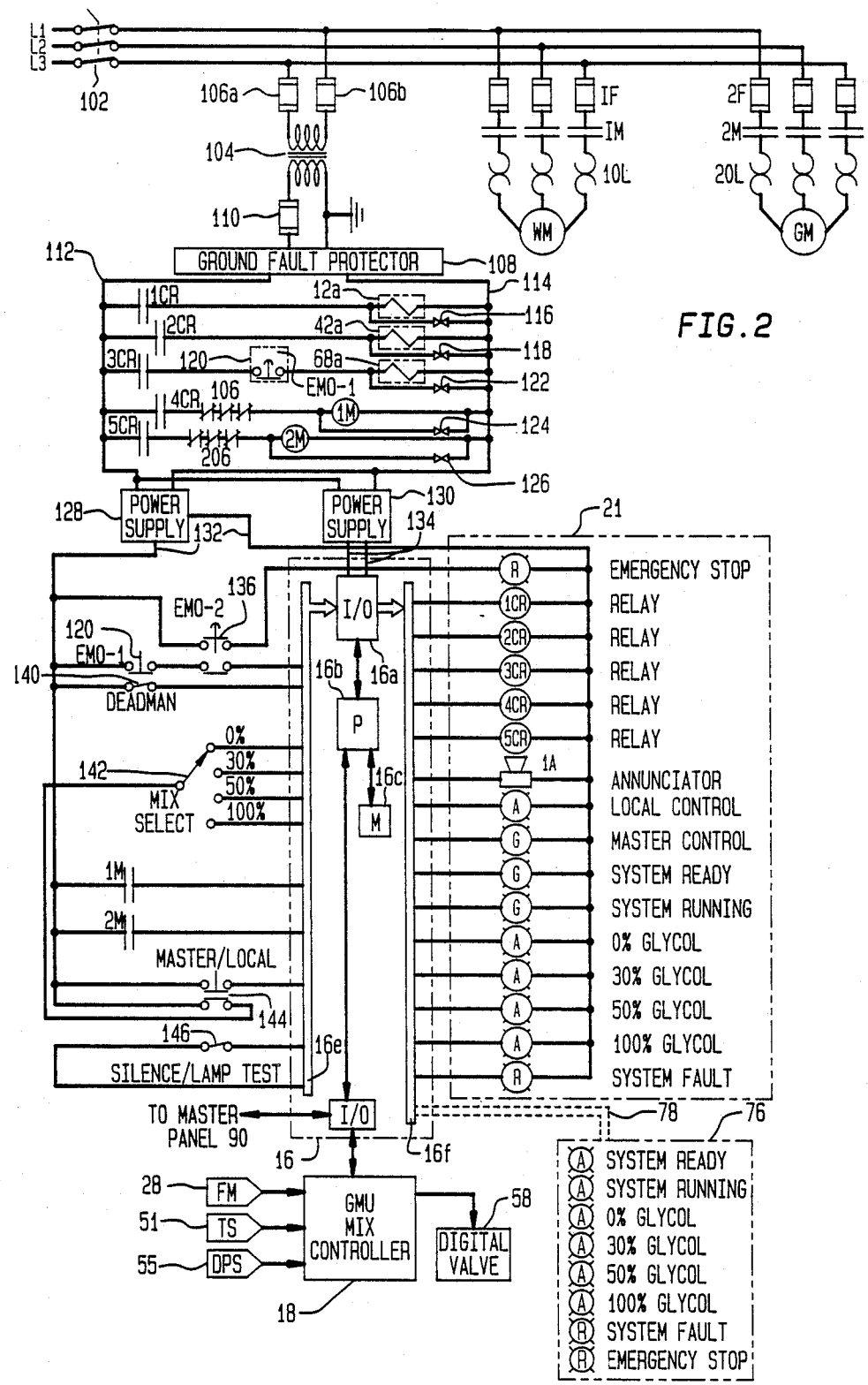
FIG. 2 is a schematic diagram of the system and apparatus of the invention.
Figure 3A:
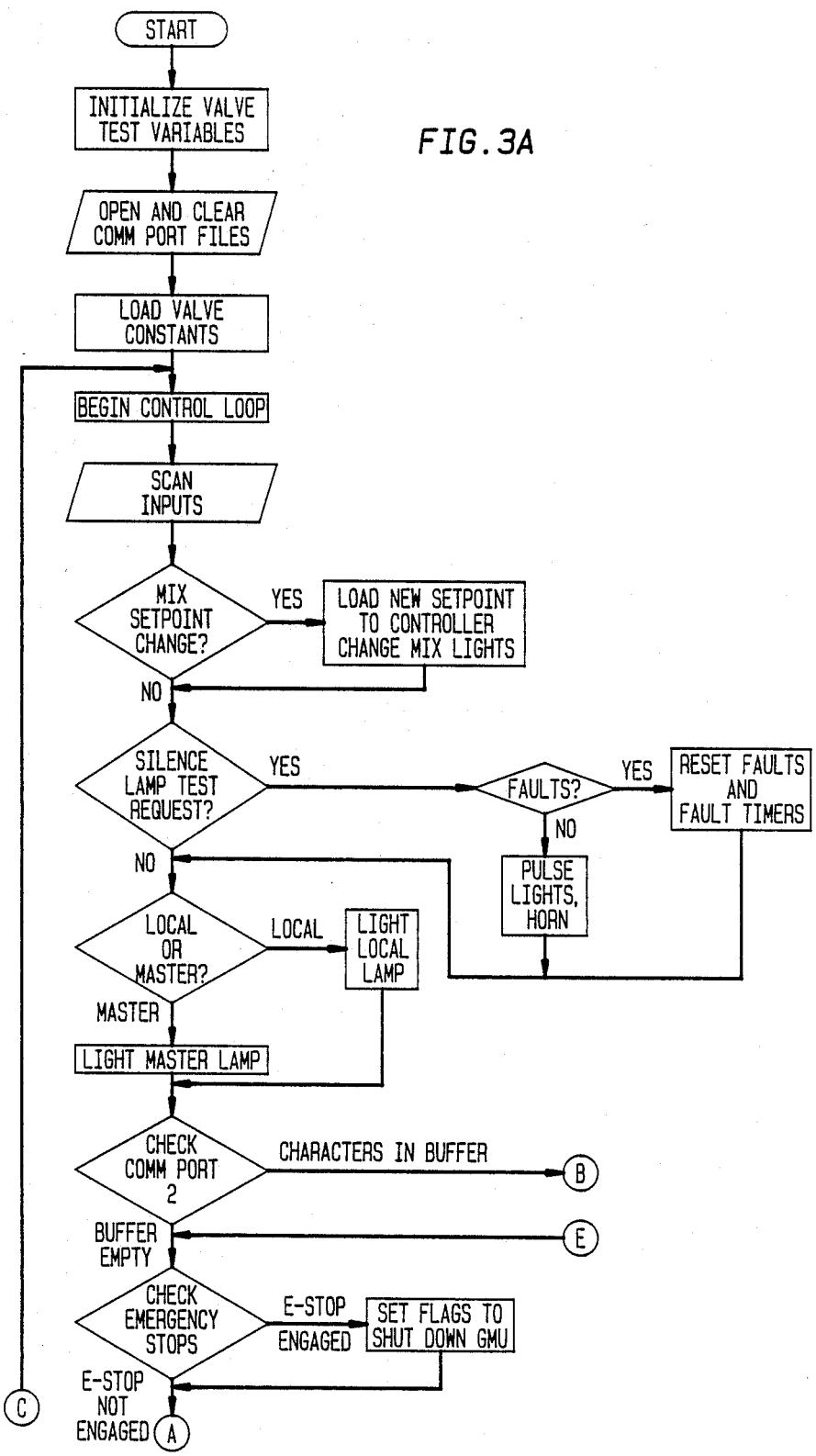
FIG. 3A–3D are a flowchart of the logic for the GMU sequence controller according to the invention.
Figure 3B:
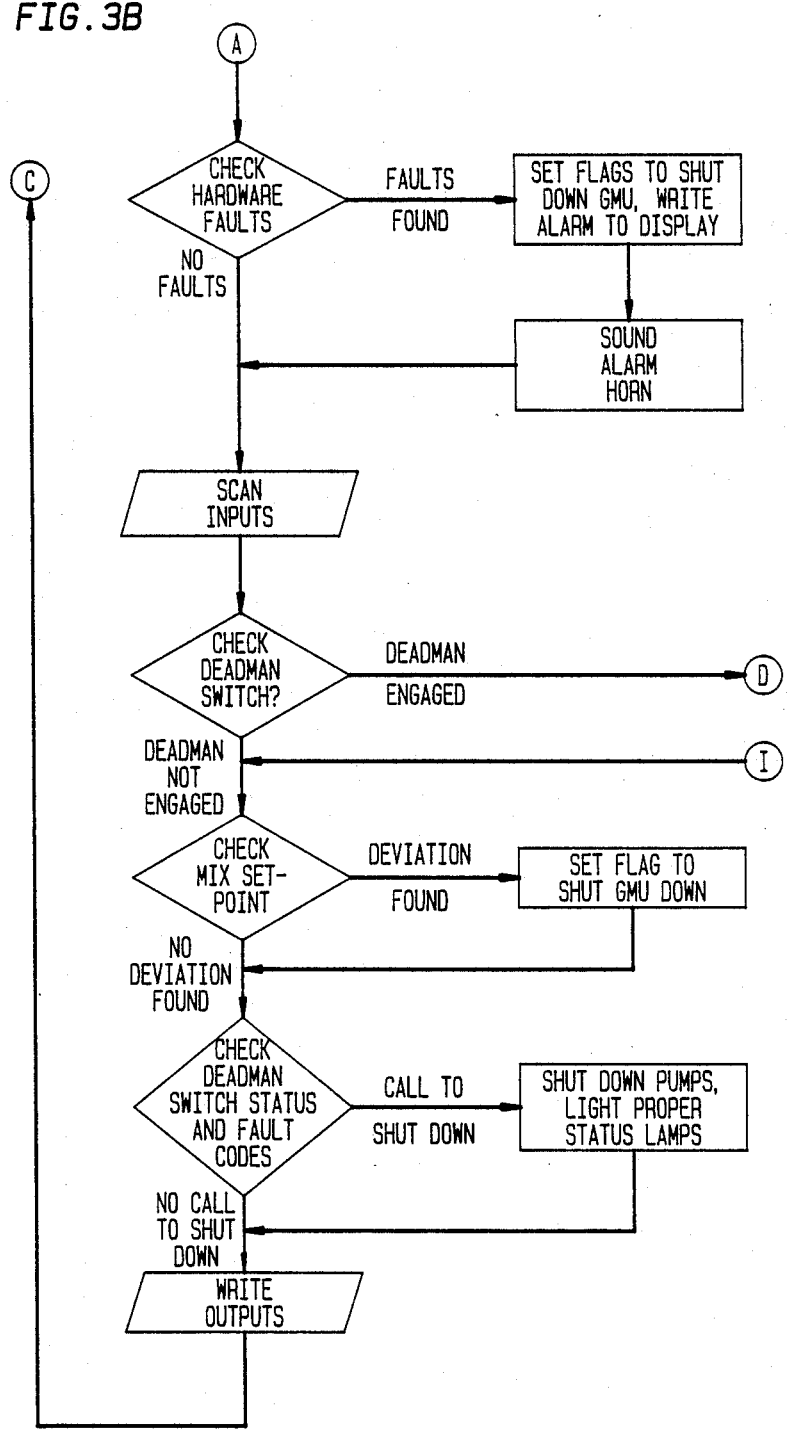
Figure 3C:
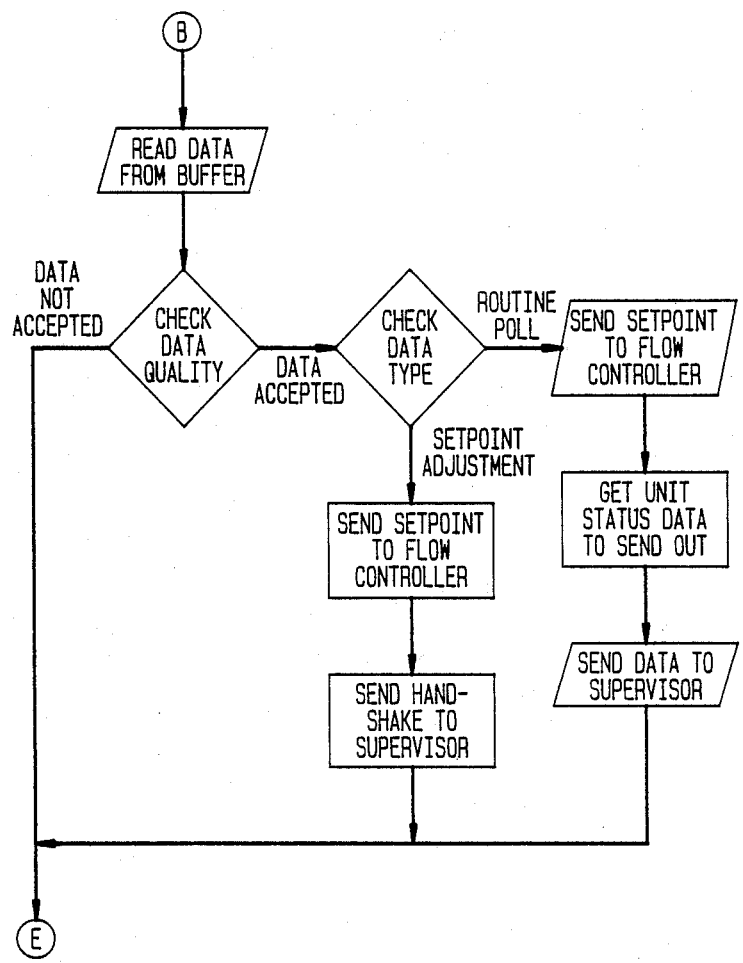
Figure 3D:
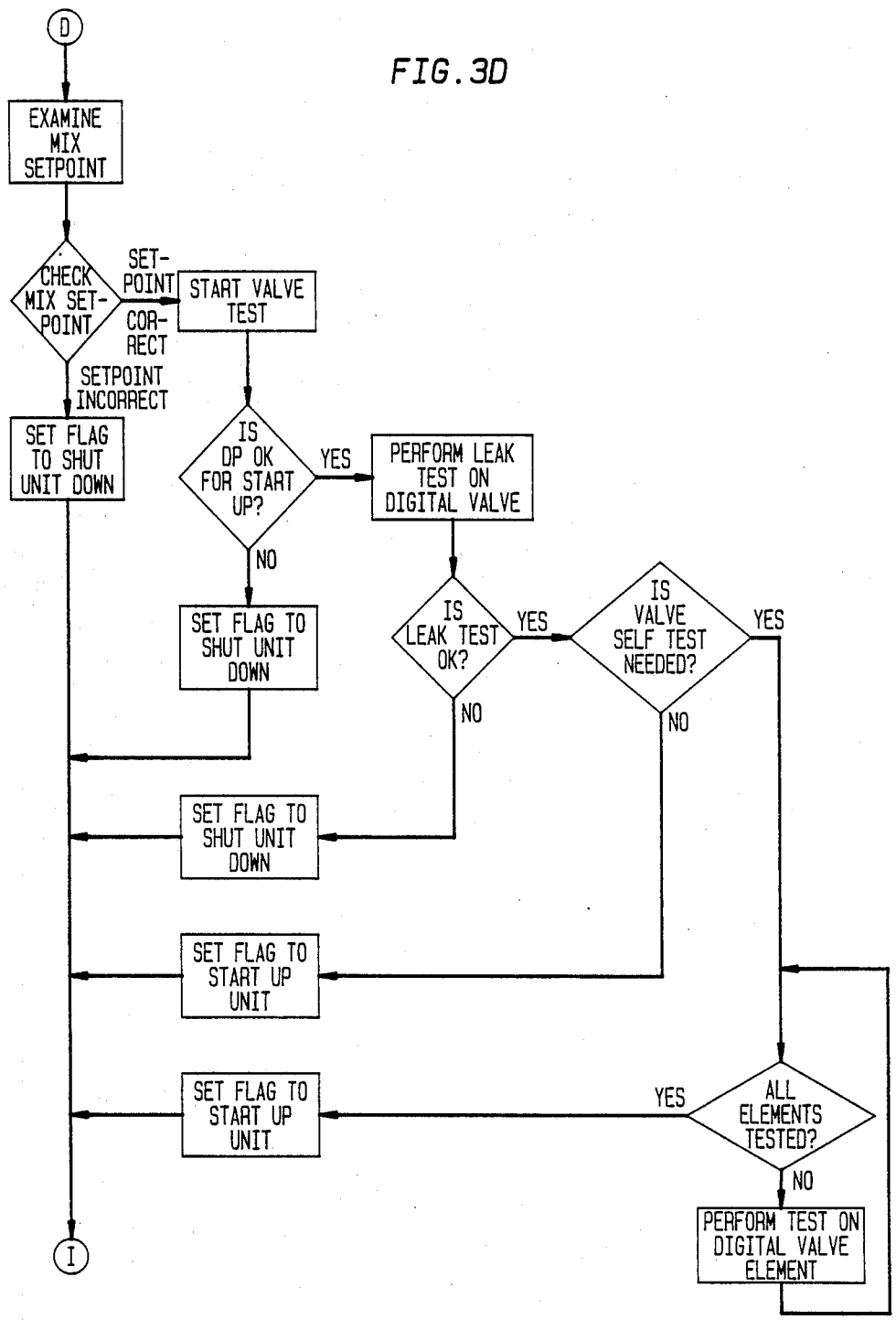

Referring now to FIG. 2, three phase, 460 VAC power is applied to lines L1, L2, L3 which include a manual disconnect switch 102. A transformer 104 has its primary winding connected through fuses 106a, b to lines 1L1, 1L3. The secondary winding provides 120 VAC and is coupled to a ground fault protector 108 thru a fuse 110.

Three phase water pump motor WM is coupled in each phase through an overload protector 10L, a start contactor 1M, and a fuse 1F to a respective lines L1 to L3. Similarly, three phase glycol pump motor GM is coupled in each phase through an overload protector 20L, a start contactor 2M, and a fuse 2F to a respective lines L1 to L3.

Connected in parallel between leads 112, 114 is a first circuit including contact 1CR of on-off control relay 1CR, solenoid coil 12a of water inlet valve 12 of FIG. 1. A surge suppressor diode 116 is connected across coil 12a. The second circuit includes contact 2CR and solenoid coil 42a of glycol inlet valve 42. A surge suppressor diode 118 is coupled across coil 42a.

The third parallel circuit includes relay contacts 3CR, emergency off contacts 120, hose valve coil 68a, and surge suppressor 122. The fourth parallel circuit includes in series relay contacts 4CR, the three start contacts 10L, starter 1M for the water pump motor. A surge suppressor 124 is connected across starter 1M. The last parallel circuit includes in series relay contacts 5CR, start contacts 20L, starter 2M for glycol pump motor. A surge suppressor 126 is connected across starter 2M.

Lines 112 and 114 couple 120 VAC to power supplies 128, 130. The outputs 132, 134 of power supplies 128, 130 are 24 volt DC, and coupled as indicated to the input control switches, the GMU sequence controller 16, and output control panel display 21.

The GMU sequence controller 16 comprises a digital input/output (I/O) device 16a, processor 16b, memory 16c, and communication input/output (I/O) device 16d. Controller 16 is connected via lines 17 to controller 18 and via lines 90 to master control panel thru communications input/output device 16d. Controller 18 has inputs from the flow meter 28, temperature sensor 51, and differential transmitter 55. In response to these input signals, the controller 18 is pre-programmed to selectively open and close predetermined valve openings in the digital valve 58. In the preferred embodiment, I/O device 16a is a 16 port digital input circuit card and a 32 port digital output card; processor 16b is an IBM compatible regular XT model 2904, mother board, 640K RAM; memory 16c is a universal memory card, 8 bank PROM; and I/O device 16d is a dual serial port circuit card.

Switch inputs to I/O device 16a are connected thru buss 16e and schematically shown to include a remote panel emergency off switch 136, the local emergency off switch 120, a dead man switch 140, a mix selector switch 142, auxiliary contacts 1M and 2M for water and glycol pump motors master/local key lock switch 144, and a silence/lamp test switch 146.

Local output control display panel 21 includes as indicated emergency stop button, relay coils 1CR to 5CR, annunciator alarm 1A, local and master control lights, system ready and running lights, and light indicators for percentage glycol, and a system fault indicator light. Except for emergency stop indicator, local panel 21 is connected to input/output device 16a through buss 16f.

In a similar arrangement, remote display panel 76, having similarly connected indicator lights and an emergency stop button, is connected by multiple connectors 78 thru buss 16f to I/O device 16a.

The sequence of operation of the apparatus of the invention is carried out under the control of the GMU sequence control pursuant to a program stored in memory 16c. A logic flow chart of this program is shown in FIGS. 3A–3D. The operation of microprocessor 16b in accordance with the various inputs and the program stored in memory 16c controls through digital I/O device 16a and communication I/O device 16c the operating and sequence of the apparatus to effect the selected gylcol and water mix concentrations.

In summary, the glycol mixing unit is a skid mounted pumping package which automatically mixes and delivers a selected solution of glycol and water. The GMU mix controller throttles the flow of glycol, based on the preset sequence controller solution concentration in response to the water flow rate. Using typical values, these flows would be:

(1) 0% glycol=0 gal/min glycol flow, 100 gal/min water flow
(2) 30% glycol=33 gal/min glycol flow, 100 gal/min water flow
(3) 50% glycol=100 gal/min glycol flow, 100 gal/min water flow
(4) 100% glycol=100 gal/min glycol flow, 0 gal/min water flow Under actual conditions, the water flow rate will be sensed and the flow of glycol will be controlled by the multi-port digital valve which opens and closes any number of ten possible elements, or parts, to accommodate the required flow. The control of these parts is provided by the GMU mix controller. The temperature sensor, pressure differential sensor, and water flowmeter all send vital data to the GMU mix controller, allowing it to constantly monitor and correct the mixture as necessary.

A number of status indication lights display the condition of the unit, even if it is not pumping at the time. A keyswitch allow the control of the GMU sequence controller to be placed locally, or from a master unit. When in the local mode, the glycol concentration percentage is selected at the unit itself by a mixture select keyswitch.

A remote panel adjacent to the hose has status indicators and an emergency stop switch. A deadman switch located at the hose enables the GMU sequence controller which opens a solenoid valve located in the piping between the digital valve and hose. Thus, depressing the deadman switch sends a signal to the GMU sequence controller which then opens the solenoid valve and simultaneoulsy begins pumping mixture.

Alarm conditions will result in GMU sequence controller shut down with displayed indication of alarm cause, and the GMU sequence controller will energize the system fault lights at the local and remote panel displays.

While the present invention has been disclosed in connection with preferred embodiment thereof, it should be understood that there may be other embodiments which fall within the spirit and scope of the invention as defined by the following claims.

We claim:
1. Apparatus comprising:
water pump means for supplying water to an output line means;
flow sensor means for detecting the flow rate of said water;
additive pump means for supplying an additive;
a multi-port control valve having an input coupled to said additive pump means and an output coupled to said output line means;
a temperature sensor for detecting the temperature of the additive coupled to said input of said multi-port control valve;
a differential pressure sensor means coupled across the input and output of said multi-port control valve to detect the differential pressure across said multi-port control valve; and
controller means responsive to said flow, temperature, and differential pressure sensor means to control the amount of additive supplied from said multi-port control valve.

2. Apparatus according to claim 1, further comprising sequence controller means coupled to said controller means.

3. Apparatus according to claim 2 comprising
water valve means coupled to said water pump means for controlling the water input to said water pump means in response to said sequence controller means.

4. Apparatus according to claim 3 comprising
additive valve means coupled to said additive pump means for controlling the additive input to said additive pump means in response to said sequence controller means.

5. Apparatus according to claim 2 comprising
output hose means coupled to said output line means for delivering a predetermined mixed output of water and additive.

6. Apparatus according to claim 5 comprising
output valve means coupled between said multi-port control valve and said hose means.

7. Apparatus according to claim 2 comprising
selection means coupled to said sequence control means for selecting a percentage of additive to be added to said water.

8. Apparatus according to claim 2 comprising
local panel means for indicating the status of operation of the apparatus.

9. Apparatus according to claim 5 comprising
remote panel means for indicating the status of operation of the said output hose means.

10. Apparatus for mixing glycol and water comprising:
a water supply line;
a multi-port digitally controlled flow valve having a fixed glycol input and a variable glycol output;
controller means coupled to said multi-port valve to control the glycol output;
flow meter signal means coupled to said controller means for indicating a flow rate of water;
temperature sensor signal means coupled to said controller means for indicating the temperature of said fixed glycol input;
pressure sensor signal means coupled between the input and output of said multi-port valve for indicating to said controller means the differential pressure; and
selection means coupled to said controller means for predetermining the glycol output to be mixed with said water supply line.

11. De-icing apparatus comprising in combination:
pump means for supplying water to an output means;
flow sensor means for detecting the flow rate of said water;
pump means for supplying a de-icing fluid to said output means;
a multi-port control valve coupled between said pump means supplying de-icing fluid and said output means;
a temperature sensor for detecting the temperature of the de-icing fluid supplied to said multi-port control valve;
a differential pressure sensor means coupled across the input and output of said multi-port control valve to detect the differential pressure across said multi-port control valve; and
mix controller means responsive to signals from said flow, temperature, and differential pressure sensor means to control the amount of de-icing fluid coupled to said output means from said multi-port control valve.

12. The combination of claim 11 including
   sequence controller means coupled to said mix controller means.

13. The combination of claim 12 including
   water valve means coupled to said water supply pump means for controlling the water input to said water supply pump means in response to said sequence controller means.

14. The combination of claim 13 including
   de-icing fluid valve means coupled to said de-icing fluid pump means for controlling the de-icing fluid input in response to said sequence controlled means.

15. The combination of claim 14 wherein said output means includes
   hose means having a deadman switch for delivering a predetermined mixed output of water and de-icing fluid.

16. The combination of claim 15 further including
   output valve means coupled between said multi-port control valve and said hose means.

17. The combination of claim 16, including
   switch selection means coupled to said sequence control means for selecting a percentage of de-icing fluid to be added to said water.

18. The combination of claim 17 including
   panel means for indicating the status of operation.

19. Apparatus for mixing a supply of glycol and water comprising
   a multi-port digitally controlled flow valve having an input coupled to said supply of glycol and a variable glycol output;
   mix controller means coupled to said multi-port valve to control the glycol output;
   flow meter signal means coupled to said mix controller means for indicating the flow rate of said supply of water;
   temperature sensor signal means coupled to said mix controller means for indicating the temperature of said supply of glycol;
   pressure signal means coupled between the input and output of said multi-port valve for indicating to said mix controller means the differential pressure; and
   selection and sequence controller means coupled to said mix controller means, whereby a predetermined amount of glycol is mixed with said water supply.

20. De-icing apparatus comprising in combination:
   means for supplying water to an output means;
   flow sensor means for detecting the flow rate of said water supply;
   means for supplying glycol;
   a multi-port control valve having an input coupled to receive said glycol supply and a variable glycol output coupled to said output means;
   temperature sensor means for detecting the temperature of said glycol supply;
   differential pressure sensor means for detecting the differential pressure across said multi-port control valve;
   mix controller means coupled to control the amount of glycol supplied to said output means from said multi-port control valve in response to said flow sensor means, said temperature sensor means, and said differential pressure sensor means; and
   sequence controller means coupled to said mix controller means for selecting the glycol concentration and controlling the sequence of operation of the apparatus.

* * * * *